(12) United States Patent
Tsuji et al.

(10) Patent No.: US 9,970,516 B2
(45) Date of Patent: May 15, 2018

(54) VEHICLE CONTINUOUSLY VARIABLE TRANSMISSION EQUIPPED WITH SEAL MECHANISM

(71) Applicant: JATCO Ltd, Fuji-shi, Shizuoka (JP)

(72) Inventors: Yoichi Tsuji, Sagamihara (JP); Takayuki Suzuki, Hiratsuka (JP); Hirofumi Koshiji, Hadano (JP); Kouichi Katou, Hiratsuka (JP); Katsuyuki Umezawa, Atsugi (JP)

(73) Assignee: JATCO Ltd, Fuji-Shi (JP)

( * ) Notice: Subject to any disclaimer, the term of this patent is extended or adjusted under 35 U.S.C. 154(b) by 10 days.

(21) Appl. No.: 15/127,316

(22) PCT Filed: Mar. 13, 2015

(86) PCT No.: PCT/JP2015/057413
§ 371 (c)(1),
(2) Date: Sep. 19, 2016

(87) PCT Pub. No.: WO2015/146616
PCT Pub. Date: Oct. 1, 2015

(65) Prior Publication Data
US 2017/0152924 A1 Jun. 1, 2017

(30) Foreign Application Priority Data
Mar. 24, 2014 (JP) .................................. 2014-060078

(51) Int. Cl.
*F16H 59/00* (2006.01)
*F16H 61/00* (2006.01)
(Continued)

(52) U.S. Cl.
CPC ............... *F16H 9/18* (2013.01); *F16H 55/56* (2013.01); *F16H 63/065* (2013.01)

(58) Field of Classification Search
CPC .. F16H 55/56; F16H 61/66272; F16H 61/662; F16H 9/18
(Continued)

(56) References Cited

U.S. PATENT DOCUMENTS

| 2 A | * | 7/1836 | Goulding ................... C02F 1/00 57/58.49 |
| 4,023,425 A | * | 5/1977 | Parker ...................... F16H 55/56 474/16 |

(Continued)

FOREIGN PATENT DOCUMENTS

| EP | 1 331 422 A1 | 7/2003 |
| JP | S36-024529 Y1 | 9/1961 |

(Continued)

*Primary Examiner* — Henry Y Liu
(74) *Attorney, Agent, or Firm* — Foley & Lardner LLP

(57) ABSTRACT

A vehicle continuously transmission mechanism includes a seal mechanism to seal a hydraulic chamber defined by fixed and movable members on a back surface side of a movable sheave of a pulley or seal an oil passage communicating with the hydraulic chamber. This seal mechanism has an annular seal member normally brought into intimate contact with an opposing surface of the sliding contact part and a lip seal member formed with an annular lip such that a tip end of the annular lip is directed toward the outside and a side surface of the annular lip located closer to the hydraulic chamber or oil passage is brought into elastic contact with the opposing surface of the sliding contact part.

5 Claims, 3 Drawing Sheets

(51) Int. Cl.
*F16H 63/00* (2006.01)
*F16H 9/18* (2006.01)
*F16H 63/06* (2006.01)
*F16H 55/56* (2006.01)

(58) Field of Classification Search
USPC .......................................................... 474/28
See application file for complete search history.

(56) References Cited

U.S. PATENT DOCUMENTS

| | | | | |
|---|---|---|---|---|
| 4,552,545 A * | 11/1985 | Koivunen | ......... | F16H 61/66272 474/13 |
| 4,639,238 A * | 1/1987 | Jaccod | .................... | F16H 55/56 474/28 |
| 4,639,239 A * | 1/1987 | Thirion de Briel | .. | F16J 15/3268 474/28 |
| 4,717,368 A * | 1/1988 | Yamaguchi | ........... | F16H 61/662 474/28 |
| 5,221,235 A * | 6/1993 | Ogawa | .................... | F16H 55/56 474/25 |
| 5,711,730 A * | 1/1998 | Friedman | ................ | F16H 59/14 474/18 |
| 5,776,022 A * | 7/1998 | Schellekens | .......... | F16H 63/065 474/18 |
| 6,089,999 A * | 7/2000 | Imaida | .................. | F16H 63/065 474/18 |
| 6,174,253 B1 * | 1/2001 | Walter | ...................... | F16H 9/18 474/18 |
| 6,190,274 B1 * | 2/2001 | Walter | ...................... | F16H 9/06 474/28 |
| 6,234,925 B1 * | 5/2001 | Walter | .................. | F16H 63/065 267/180 |
| 6,241,635 B1 * | 6/2001 | Schmid | ................... | F16H 55/56 474/11 |
| 6,336,878 B1 * | 1/2002 | Ehrlich | .................... | F16H 55/56 474/18 |
| 6,342,024 B1 * | 1/2002 | Walter | .................. | F16H 37/021 475/210 |
| 6,361,456 B1 * | 3/2002 | Walter | .................... | F16H 55/56 474/18 |
| 6,361,470 B1 * | 3/2002 | Friedmann | .............. | F16H 55/56 474/28 |
| 6,394,920 B1 * | 5/2002 | Morlok | ................... | F16H 61/00 474/18 |
| 6,565,465 B2 * | 5/2003 | Nishigaya | ............... | F16H 55/56 474/18 |
| 6,669,588 B2 * | 12/2003 | Schmid | ............. | F16H 61/66272 474/17 |
| 6,962,542 B2 * | 11/2005 | Van Spijk | ............... | F16H 55/56 474/18 |
| 7,264,564 B2 * | 9/2007 | Walter | .................... | F16H 55/56 474/18 |
| 7,517,295 B2 * | 4/2009 | Faust | ...................... | F16H 55/56 474/12 |
| 7,686,715 B2 * | 3/2010 | Carlson | ................. | F16H 63/065 474/18 |
| 8,092,325 B2 * | 1/2012 | Nozawa | ................. | F16H 63/065 474/18 |
| 8,147,364 B2 * | 4/2012 | Shioiri | .............. | F16H 61/66263 474/28 |
| 8,414,433 B2 * | 4/2013 | Kadokawa | ................ | F16H 9/18 474/18 |
| 2005/0272539 A1 * | 12/2005 | Kouta | ..................... | F16H 55/56 474/18 |

FOREIGN PATENT DOCUMENTS

| | | |
|---|---|---|
| JP | S61-160658 A | 7/1986 |
| JP | 09-257110 A | 9/1997 |
| JP | 2005-291402 A | 10/2005 |
| JP | 2005-344922 A | 12/2005 |
| JP | 2010-230132 A | 10/2010 |

* cited by examiner

VEHICLE CONTINUOUSLY VARIABLE TRANSMISSION EQUIPPED WITH SEAL MECHANISM

TECHNICAL FIELD

The present invention relates to a vehicle continuously variable transmission having a seal mechanism for sealing a hydraulic chamber on the back surface side of a movable sheave of a primary or secondary pulley or an oil passage communicating with the hydraulic chamber.

BACKGROUND ART

A belt-type continuously variable transmission of a vehicle includes a primary pulley, a secondary pulley and a belt wound around the primary and secondary pulleys so as to change the widths of V-grooves between movable sheaves and fixed sheaves of the primary and secondary pulleys by axial movements of the movable sheaves relative to the fixed sheaves and thereby vary the speed ratio of the transmission. In general, the movable sheaves are actuated by hydraulic pressure. Hydraulic chambers (piston chambers) are thus provided on the back surface sides of the movable sheaves to apply hydraulic pressure to the movable sheaves.

The hydraulic chambers on the back surface sides of the movable sheaves are defined by structural members adjacent to the fixed and movable sheaves. There are sliding contact parts between these structural members. Seal members are arranged in the respective sliding contact parts so as to prevent oil leakage from the hydraulic chambers to the outside. Each of the primary and secondary pulleys is adapted to clamp the belt between the fixed sheave and the movable sheave and transfer power to or from the belt. The belt clamping force of the pulley depends on the hydraulic pressure of oil inside the hydraulic chamber. In order to avoid slippage of the belt, high hydraulic pressure needs to be applied to the hydraulic chamber. It is necessary to prevent oil leakage from the hydraulic chamber even under such high pressure conditions.

In the case of an idle-stop vehicle in which only an engine-driven oil pump is used as a hydraulic pressure source for pulleys of a continuously variable transmission, the oil pump is stopped and does not supply hydraulic oil to hydraulic chambers of the pulleys during idle-stop control. As the automatic stop time of the engine under the idle-stop control becomes long, the hydraulic oil gradually leaks from the hydraulic chamber through a sliding contact part of the transmission pulley. This leads to the entry of air into the hydraulic chamber. The entry of air into the hydraulic chamber makes it necessary to take time to fill the hydraulic chamber with hydraulic oil, which results in deterioration of startability.

Under the above circumstances, Patent Document 1 discloses a technique to prevent the entry of air into the hydraulic chamber from around a resin seal ring (seal member) in the sliding contact part of the transmission pulley. In the disclosed technique, the engine-driven oil pump is actuated by forcibly restarting the engine upon the lapse of a predetermined time period T from automatic stop of the engine. In particular, the time period T is increased with increase in oil temperature in view of changes in the amount of oil leaking from around the seal ring due to the temperature dependence of the resin. By such control, the entry of air into the hydraulic chamber of the transmission pulley is suppressed so as to avoid slippage of the belt at restart of the engine and ensure the startability of the vehicle.

In the technique of Patent Document 1, the engine is forcibly restarted to actuate the oil pump for prevention of the entry of air into the hydraulic chamber. However, fuel is consumed by forcible start of the engine. In terms of fuel efficiency, it is effective to stop the engine for a longer time. There is a demand to develop a technique capable of, even when the engine is stopped, preventing the entry of air into the hydraulic chamber of the transmission pulley.

It is conceivable to prevent the entry of air into the hydraulic chamber of the transmission pulley by the use of multiple seal members. The seal members, when used in a larger number, causes a larger sliding resistance against the sliding surface. The moving response of the movable sheave deteriorates with increase in sliding resistance, whereby the speed ratio of the transmission cannot be controlled properly due to deterioration of speed ratio control response. For this reason, it is desired to improve the ability of sealing the hydraulic chamber by sealing member while suppressing increase in sliding resistance.

The entry of air into the hydraulic chamber from through the seal area of the seal members occurs as the hydraulic pressure inside the hydraulic chamber and hydraulic system communicating therewith becomes decreased. The leakage of oil from the oil pump hydraulic pressure source is a cause of decrease in inside hydraulic pressure. Although the oil pump is driven to suck and discharge oil from an oil tank, the oil returns to the oil tank under its own weight during stop of the oil pump to cause decrease in the hydraulic pressure inside the hydraulic system. With such decrease in hydraulic pressure, outside air enters through the seal area of the seal members.

The characteristics of oil return to the oil tank vary depending on the kind of the oil pump. In the case of a gear pump, for example, a part of gear in the pump case is held in contact with an inner wall of the pump room during stop of the pump so as to suppress the return of oil to the oil tank and prevent the entry of air into the hydraulic chamber. In the case of a vane pump, on the other hand, ends of the vanes are separated from an inner wall of the pump room during stop of the pump so as to cause the early entry of air into the hydraulic chamber without being able to suppress the return of oil to the oil tank. It is thus more desired to improve the ability of sealing the hydraulic chamber during stop of the oil pump in the case where the oil pump is of the type, like vane pump, that causes the early entry of air into the hydraulic chamber during stop of the pump.

The present invention has been made to solve the above problems. It is an object of the present invention to provide a vehicle continuously variable transmission with a seal mechanism capable of improving the ability of sealing a hydraulic chamber of a transmission pulley, or an oil passage communicating with the hydraulic chamber, by seal member even during stop of a pump while suppressing increase in sliding resistance. It should be understood that: the object of the present invention is not limited to the above; and it is also an object of the present invention to achieve any of features and effects by the respective configurations of the after-mentioned embodiment, which cannot be achieved by conventional techniques.

PRIOR ART DOCUMENTS

Patent Documents

Patent Document 1: Japanese Laid-Open Patent Publication No. 2010-230132

SUMMARY OF THE INVENTION (1) According to one aspect of the present invention, there is provided a continuously variable transmission of a vehicle, comprising:
primary and secondary pulleys each having a fixed sheave and a movable sheave driven by hydraulic pressure from a hydraulic pressure source; and
a belt wound around the primary and secondary pulleys;
a fixed member arranged on a back surface side of the movable sheave and fixed to a shaft around which the fixed sheave is disposed;
a movable member fixed to the back surface side of the movable sheave;
a hydraulic chamber defined by the movable member and the fixed member; and
a oil passage communicating with the hydraulic chamber,
a sliding contact part being formed to partition either the hydraulic chamber or the oil passage from the outside,
wherein the continuously variable transmission further comprises a seal mechanism that seals the sliding contact part by being brought into intimate contact with an opposing surface of the sliding contact part from a side at which the seal mechanism is mounted, and
wherein the seal mechanism comprises:
an annular seal member normally brought into intimate contact with the opposing surface; and
a lip seal member provided with an annular lip such that a tip end of the annular lip is directed toward the outside from a side at which the either the hydraulic chamber or the oil passage is located and such that a side surface of the annular lip located closer to the either the hydraulic chamber or the oil passage is brought in elastic contact with the opposing surface.

(2) It is preferable that the hydraulic pressure source has a mechanical pump driven by an engine of the vehicle.

(3) It is preferable that the sliding contact part is formed between the fixed member and the movable member.

(4) It is preferable that: the shaft around which the fixed sheave is disposed has a shaft center hole formed therein along a center line of the shaft and communicating with the hydraulic chamber through a communication passage; the continuously variable transmission further comprises a tubular member inserted at one end portion thereof in the shaft center hole and having a hollow hole communicating with the hydraulic pressure source; the oil passage is defined by the hollow hole, the shaft center hole and the communication passage; and the sliding contact part is formed between an inner circumference of the shaft center hole and an outer circumference of the tubular member.

(5) It is preferable that the hydraulic pressure source has a vane pump.

It is further preferable that the seal mechanism alternatively comprise: an annular seal member (first seal member) normally brought into intimate contact with the opposing surface; and an annular seal member (second seal member) brought at a tip end portion thereof into intimate contact with the opposing surface only in a state that the movable sheave is in a lowest speed ratio position.

In the vehicle continuously variable transmission, there is a possibility that outside air may enter the hydraulic chamber or oil passage through the sliding contact part and mix into hydraulic oil when the hydraulic pressure inside the hydraulic chamber and oil passage becomes decreased by stop of the supply of hydraulic oil from the hydraulic pressure source. In the present invention, the seal mechanism is arranged in the sliding contact part. This seal mechanism is characterized by having not only the annular seal member but also the lip seal member. The annular seal member is normally brought into intimate contact with the opposing surface of the sliding contact part. The annular lip of the lip seal member is brought into elastic contact with the opposing surface of the sliding contact part, with the tip end of the annular lip being directed toward the outside from the hydraulic chamber or oil passage side. With decrease in hydraulic pressure, the annular lip is drawn toward the hydraulic chamber or oil passage side so as to enhance the sliding contact between the annular lip and the opposing surface, prevent the entry of outside air and suppress the mixing of air and hydraulic oil. It is therefore possible to, in the case where the vehicle has an idle-stop function and uses an engine-driven oil pump as the hydraulic pressure source, start the oil pump upon restart of the engine and promptly raise the hydraulic pressure inside the hydraulic chamber for speed ratio control and thereby possible to achieve quick and smooth start of the vehicle.

During normal running of the vehicle, the hydraulic pressure inside the hydraulic chamber and oil passage becomes increased with the supply of hydraulic pressure to the hydraulic chamber. This makes it likely that hydraulic oil will leak from the hydraulic chamber or oil passage to the outside. However, the leakage of hydraulic oil is prevented by normally bringing the annular seal member into contact with the opposing surface. With increase in hydraulic pressure, the annular lip of the lip seal member is not drawn toward the hydraulic chamber or oil passage side. The sliding contact between the annular lip and the opposing surface is then weakened so as to suppress the sliding resistance of the lip seal member even though such weakened contact is not effective in prevention of oil leakage. It is therefore possible to ensure the speed ratio control response of the transmission without causing deterioration in the moving response of the movable sheave.

DETAILED DESCRIPTION OF THE EMBODIMENTS

Hereinafter, one embodiment of the present invention will be described below with reference to the drawings. It should be understood that: the following embodiment is merely an application example of the present invention and is not intended to exclude the adoption of various modifications and techniques not discussed below; and the respective configurations of the following embodiment can be appropriately modified, selected or used in combination without departing from the scope of the present invention.

[Structure of Continuously Variable Transmission]

First, a belt-type continuously variable transmission (sometimes abbreviated as "CVT") 1 according to the present embodiment will be explained below with reference to FIG. 1. Although not specifically shown in the figure, the CVT 1 is connected to an output shaft of an engine (internal combustion engine) through a torque converter etc. in a vehicle. In the present embodiment, the vehicle has an idle-stop function to automatically stop the engine upon satisfaction of predetermined engine stop conditions during stop of the vehicle and then automatically restart the engine upon satisfaction of predetermined engine restart conditions during the stop of the vehicle.

Figure 1:
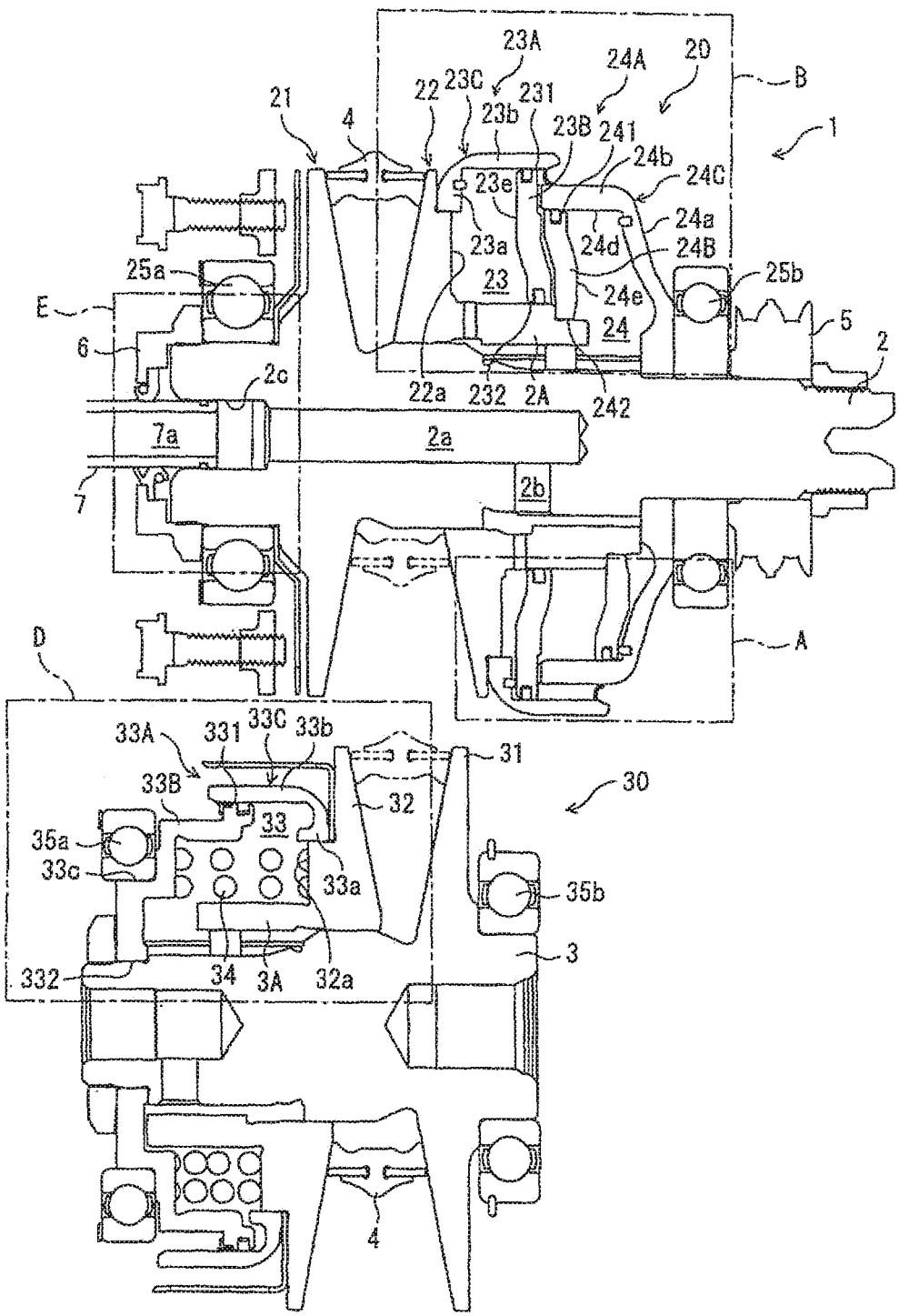
FIG. 1 a cross-sectional view of a continuously variable transmission according to one embodiment of the present invention, showing a highest speed ratio state of the transmission on the upper side of a center line of a transmission input shaft and the lower side of a center line of a transmission output shaft and showing a lowest speed ratio state of the transmission on the lower side of the center line of the transmission input shaft and the upper side of the center line of the transmission output shaft.

As shown in FIG. 1, the CVT 1 includes a primary pulley 20 mounted on a transmission input shaft 2, a secondary pulley 30 mounted on a transmission output shaft 4 and a belt 4 wound around the primary pulley 20 and the secondary pulley 30. An output torque of the engine is inputted to the transmission input shaft 2, transmitted to the transmission output shaft 3 through the primary pulley 20, the belt 4 and the secondary pulley 30 and outputted to vehicle driving wheels through a power transmission mechanism, a differential gear mechanism etc.

The primary pulley 20 has a fixed sheave 21 integrally mounted on the transmission input shaft 2 and a movable sheave 22 integrally mounted on a hollow shaft 2A which is axially movably disposed around the transmission input shaft 2. A V-shaped pulley groove is defined between a sheave surface of the fixed sheave 21 and a sheave surface of the movable sheave 22 such that the belt 4 is pressed in the pulley groove. First and second hydraulic chambers 23 and 24 are provided on the side of a back surface 22a of the movable sheave 22 so as to apply hydraulic pressure to the movable sheave 22 and thereby move the movable sheave 22 axially closer to or away from the fixed sheave 21. The transmission input shaft 2 is supported on a casing via bearings 25a and 25b at axially outer sides of the primary pulley 20.

Each of the first and second hydraulic chambers 23 and 24 is defined by a structural member (as a fixed member) arranged on the back surface side of the movable sheave 22 and fixed to the transmission input shaft 2 and a structural member (as a movable member) fixed to the back surface side of the movable sheave 22.

More specifically, a first cylinder member 23C (as the movable member) is fixed to the movable sheave 22; and a first piston member 23B (as the fixed member) is provided so as to extend radially from the transmission input shaft 2, around which the fixed sheave 21 is disposed, through the after-mentioned second cylinder member 24C. The first hydraulic chamber 23 is defined as the inner space of a first cylinder part 23A as surrounded by an inner surface of the first cylinder member 23C and an inner surface of the first piston member 23B.

The first cylinder member 23C includes a first end surface portion 23a extending outwardly from the shaft center along the back surface 22a of the movable sheave 22 and a first cylindrical portion 23b extending from the first end surface portion 23a in a direction away from the movable sheave 22 and parallel to the shaft center. The first cylinder part 23A is constituted by the first cylinder member 23C, the back surface 22a of the movable sheave 22 and an outer circumferential surface of the hollow shaft 2A.

The first piston member 23B is annular in shape and has an outer circumferential end surface (outer end surface) 231 brought into sliding contact with an inner circumferential surface of the first cylindrical portion 23b and an inner circumferential end surface (inner end surface) 232 brought into sliding contact with the outer circumferential surface of the hollow shaft 2A.

The second cylinder member 24C (as the fixed member) is fixed to the transmission input shaft 2 around which the fixed sheave 21 is disposed. Further, a second piston member 24B (as the movable member) is provided so as to extend radially from the hollow shaft 2A on which the movable sheave 22 is mounted. The second hydraulic chamber 24 is defined as the inner space of a second cylinder part 24A as surrounded by an inner surface of the second cylinder member 24C and an inner surface of the second piston member 24B.

The second cylinder member 24C includes a second end surface portion 24a extending outwardly from the shaft center and a second cylindrical portion 24b extending from the second end surface portion 24a in a direction closer to the movable sheave 22 and parallel to the shaft center. The second cylinder part 24A is constituted by the second cylinder member 24C, the outer circumferential surface of the hollow shaft 2A and an outer circumferential surface of the transmission input shaft 2.

The second piston member 24B is annular in shape and has an outer circumferential end surface (outer end surface) 241 brought into sliding contact with an inner circumferential surface of the second cylindrical portion 24b and an inner circumferential end surface (inner end surface) 242 coupled to the outer circumferential surface of the hollow shaft 2A with no clearance left therebetween.

As mentioned above, the primary pulley 20 has a double-piston structure equipped with two first and second hydraulic chambers 23 and 24 such that the hydraulic pressure can be received by the back surface 22a of the movable sheave 22 and the inner surface of the second piston member 24B. It is thus possible for the primary pulley 20 to attain a larger pressure receiving surface area and ensure a sufficient force (clamping force) for clamping the belt 4 between the fixed sheave 21 and the movable sheave 22.

The secondary pulley 30 has a fixed sheave 31 integrally mounted on the transmission output shaft 3 and a movable sheave 32 integrally mounted on a hollow shaft 3A which is axially movably disposed around the transmission output shaft 3. A V-shaped pulley groove is defined between a sheave surface of the fixed sheave 31 and a sheave surface of the movable sheave 32 such that the belt 4 is pressed in the pulley groove. A hydraulic chamber 33 is proved on the side of a back surface 32a of the movable sheave 32 so as to apply hydraulic pressure to the movable sheave 32 and thereby move the movable sheave 32 axially closer to or away from the fixed sheave 31. The transmission output shaft 3 is supported on the casing via bearings 35a and 35b at axially outer sides of the secondary pulley 30.

The hydraulic chamber 33 is also defined by a structural member (as a fixed member) arranged on the back surface side of the movable sheave 32 and fixed to the transmission output shaft 3 and a structural member (as a movable member) fixed to the back surface side of the movable sheave 32.

More specifically, a cylinder member 33C (as the movable member) is fixed to the movable sheave 32; and a piston member 33B (as the fixed member) is provided so as to extend radially from the transmission output shaft 3 around which the fixed sheave 31 is disposed. The hydraulic chamber 33 is defined as the inner space of a cylinder part 33A as surrounded by an inner surface of the cylinder member 33C and an inner surface of the piston member 33B.

The cylinder member 33C includes an end surface portion 33a extending outwardly from the shaft center along the back surface 32a of the movable sheave 32 and a cylindrical portion 33b extending from the end surface portion 33a in a direction away from the movable sheave 32 and parallel to the shaft center. The cylinder part 33A is constituted by the cylinder member 33C, the back surface 32a of the movable sheave 32 and an outer circumferential surface of the transmission output shaft 3.

A step portion 33c is formed in the piston member 33B such that the bearing 35a is disposed on a radially outer side of the step portion 33B.

The piston member 33B is annular in shape and has an outer circumferential end surface (outer end surface) 331 brought into sliding contact with an inner circumferential surface of the cylindrical portion 33b and an inner circumferential end surface (inner end surface) 332 brought into sliding contact with the outer circumferential surface of the transmission output shaft 3.

As mentioned above, the secondary pulley 30 has a single-piston structure equipped with only one hydraulic chamber 33 such that the hydraulic pressure can be received by the back surface 32a of the movable sheave 32 and the back surface of the end surface portion 33a of the cylinder member 33A. The pressure receiving surface area of the secondary pulley is not increased. However, a spring 34 is arranged in a compressed state within the hydraulic chamber 33. It is thus possible for the secondary pulley 30 to ensure a sufficient force (clamping force) for clamping the belt 4 between the fixed sheave 31 and the movable sheave 32 under the action of the hydraulic pressure inside the hydraulic chamber 33 in combination with the biasing force of the spring 34.

The primary pulley 20 loses its clamping force on the belt 4 as the hydraulic pressure inside the hydraulic chamber 23, 24 becomes decreased. On the other hand, the secondary pulley 30 allows the spring 34 to bias the movable sheave 32 toward the fixed sheave 31 and thereby maintains its clamping force on the belt 4 by the amount of such spring biasing force even when the hydraulic pressure inside the hydraulic chamber 33 becomes decreased. As a consequence, the clamping force is kept exerted on the belt 4 only by the secondary pulley 30 when the supply of the hydraulic pressure from a hydraulic pressure source to the respective hydraulic chambers 23, 24 and 33 is stopped.

The hydraulic pressure source includes an oil pump and a control valve unit to supply hydraulic oil to the respective hydraulic chambers 23, 24 and 33.

The oil pump used herein is a mechanical pump driven by the output torque of the engine and, more specifically, driven by extracting the output torque of the engine from a sprocket 5 which is fixed around the transmission input shaft 2. In the present embodiment, a vane pump is used as the mechanical pump.

The control valve unit is equipped with spool valves as regulator valve, shift control valve, shift command valve, pressure reducing valve etc., solenoids for adjustment of line pressure, primary pressure, secondary pressure etc., and actuators such as stepping motor, mode switching solenoid etc., to control the primary pressure and secondary pressure according to a shift command and thereby adjust the clamping forces of the primary and secondary pulleys 20 and 30 on the belt 4 and the ratio of winding radii of the belt 4 on the primary and secondary pulleys 20 and 30, i.e., speed ratio.

When the vehicle is stopped, the speed ratio of the CVT 1 is controlled to the lowest speed ratio by minimizing the groove width of the secondary pulley 30 to maximize the winding radius of the belt 4 on the secondary pulley 30 while maximizing the groove width of the primary pulley 20 to minimize the winding radius of the belt 4 on the primary pulley 20.

In the case where idle-stop control is executed to automatically stop the engine during the stop of the vehicle, the engine-driven mechanical pump is stopped upon stop of the engine. Consequently, the clamping force is kept exerted on the belt 4 only by the secondary pulley 30 under the action of the spring 4. The speed ratio of the CVT 1 is thus maintained at the lowest speed ratio.

[Seal Mechanism for Hydraulic Chamber]

Figure 2:
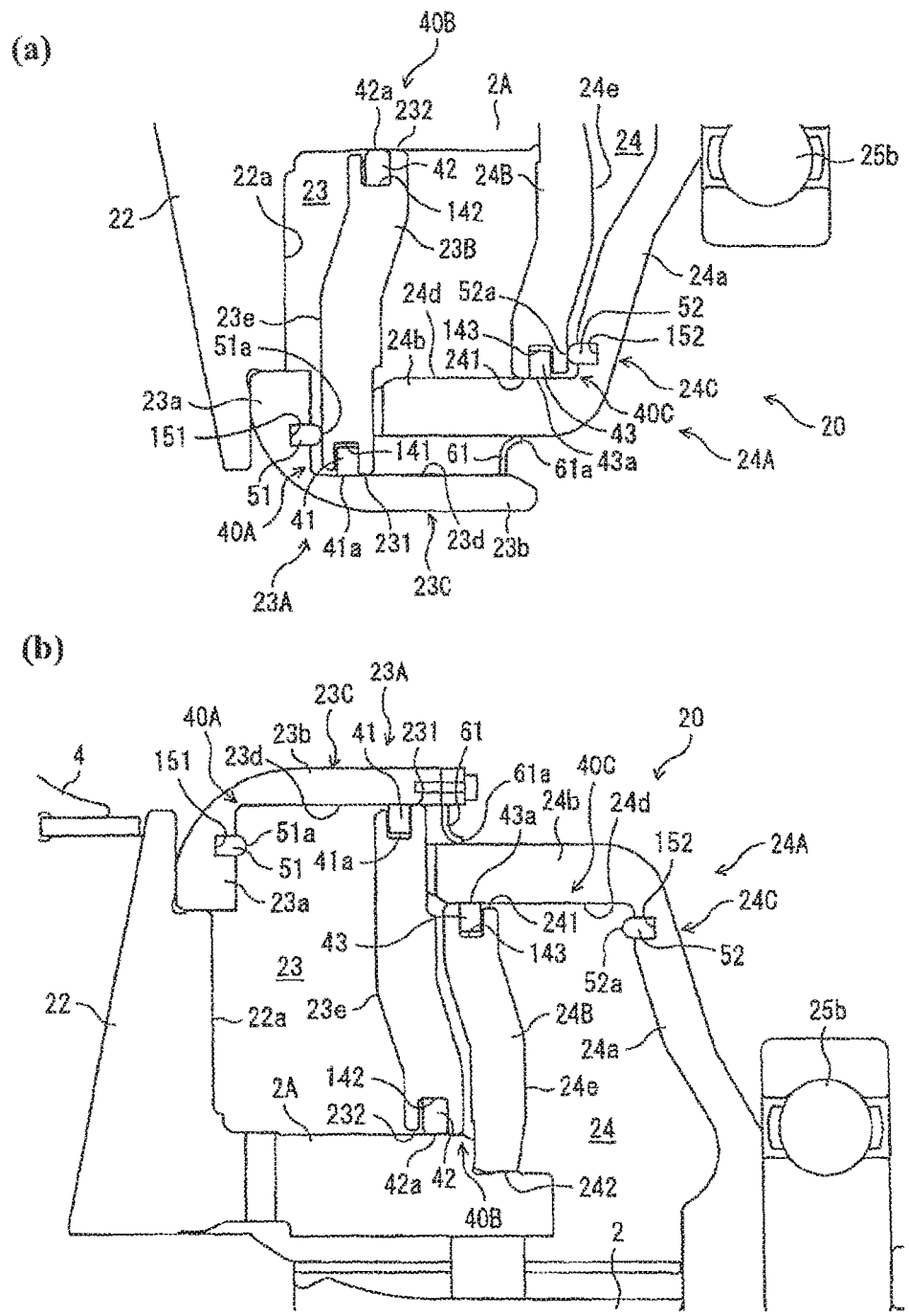
FIG. 2 is a cross-sectional view of a seal structure for a primary pulley of the transmission according to the one embodiment of the present invention, where (a) shows the seal structure in the highest speed ratio state (as corresponding to an enlarged view of area A of FIG. 1); and (b) shows the seal structure in the lowest speed ratio state (as corresponding to an enlarged view of area B of FIG. 1).
Figures 3, 4:
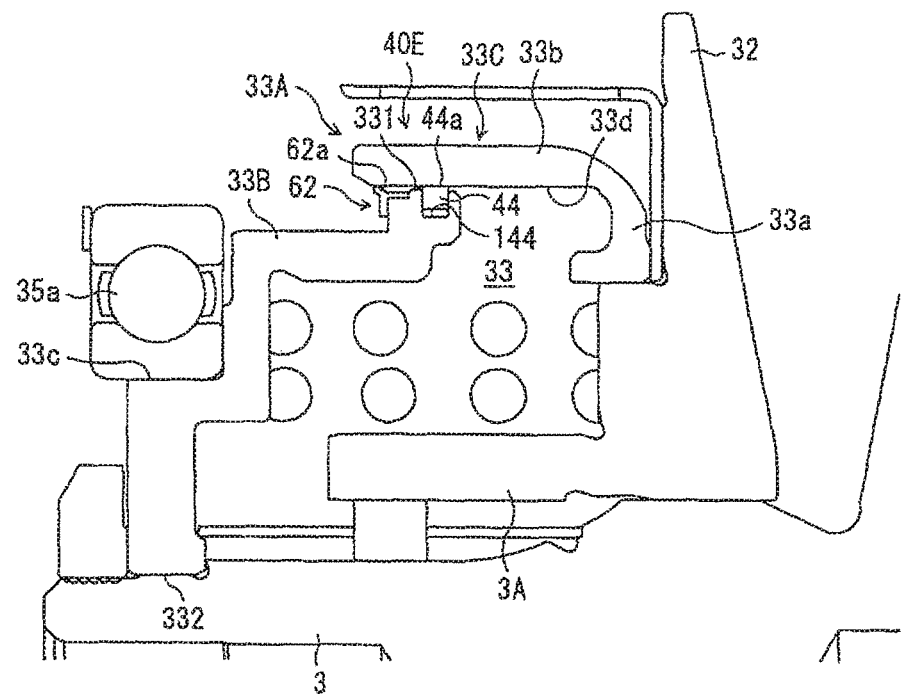
FIG. 3 is a cross-sectional view of a seal structure for a secondary pulley of the transmission according to the one embodiment of the present invention (as corresponding to an enlarged view of area D of FIG. 1).
FIG. 4 is a cross-sectional view of a seal structure for an oil passage in the transmission input shaft according to the one embodiment of the present invention (as corresponding to an enlarged view of area E of FIG. 1), showing a first example of the seal structure on the upper side of the figure and showing a second example of the seal structure on the lower side of the figure.

As shown in FIGS. 1 to 3, seal mechanisms 40A to 40C and 40E are respectively provided to the first and second hydraulic chambers 23 and 24 of the primary pulley 20 and the hydraulic chamber 33 of the secondary pulley 30 so as to seal sliding contact parts between the fixed members of the fixed sheaves 21 and 31 and the movable members of the movable sheaves 22 and 32.

In the present embodiment, each of the seal mechanisms 40A to 40C and 40E has a double-seal structure with a first seal member 41, 42, 43, 44 and either a second seal member 51, 52 or a third seal member 61 and 62. The respective seal members 41, 42, 43, 44, 51, 52, 61 and 62 can be made of various materials such as synthetic rubbers, as typified by nitrile rubber and silicone rubber, widely used for seal members.

As shown in FIG. 2, the sliding contact parts are formed in the first hydraulic chamber 23 at locations between the outer end surface 231 of the first piston member 23B and the inner circumferential surface of the first cylindrical portion 23b and between the inner end surface 232 of the first piston member 23B and the outer circumferential surface of the hollow shaft 2A; and the sliding contact part is formed in the second hydraulic chamber 24 at a location between the outer end surface 241 of the second piston member 24B and the inner circumferential surface of the second cylindrical portion 24b.

Further, the sliding contact part is formed in the hydraulic chamber 33 at a location between the outer end surface 331 of the piston member 33B and the inner circumferential surface of the cylindrical portion 33b as shown in FIG. 3.

The first seal members 41, 42, 43 and 44 are arranged in these sliding contact parts to establish seals between the cylinder members and the piston members.

The seal mechanism 40A is provided with the first seal member 41 and the second seal member 51. The seal mechanism 40B is provided with the first seal member 42 and the third seal member 61.

The first seal member 41 is arranged in an outer side of the first hydraulic chamber 23 and has a base portion fitted in an annular groove 141 of the outer end surface 231 of the first piston member 23B and a tip end portion 41a normally brought into intimate contact with the inner circumferential surface (opposing surface) 23d of the first cylindrical portion 23b from the side at which the first seal member 41 is mounted.

The first seal member 42 is arranged in an inner side of the first hydraulic chamber 23 and has a base portion fitted in an annular groove 142 of the inner end surface 232 of the first piston member 23B and a tip end portion 42a normally brought into intimate contact with the outer circumferential surface of the hollow shaft 2A.

The second seal member 51 is arranged in the first hydraulic chamber 23 and has a base portion fitted in an annular groove 151 of the inner surface of the end surface portion 23a of the first cylinder part 24A and a tip end portion 51a protruding toward the first hydraulic chamber 23 from the side at which the second seal member 51 is mounted. The tip end portion 51a of the second seal member 51 is formed in a convex curved shape and, only in a state that the movable sheave 22 is in a lowest speed ratio position, brought into contact with the opposing surface 23e of the first piston member 23B in a compressed state so as to establish a seal between the first cylinder part 23A and the first piston member 23B.

Furthermore, the third seal member (lip seal member) 61 is arranged in the first hydraulic chamber 23. In the present embodiment, the third seal member 61 is in the form of a lip seal with an annular lip 61a. The annular lip 61a has a base end fixed to a tip end of the first cylindrical portion 23b of the first cylinder part 23A (located further away from the movable sheave 22) and a tip end brought in contact with an outer circumferential surface of the second cylindrical portion 24b of the second cylinder part 24A. The tip end of the annular lip 61a is curved and directed away from the movable sheave 22 (i.e. directed in the outside direction). The third seal member 61 is thus adapted to, when the hydraulic pressure inside the first hydraulic chamber 23 becomes lower than the outside pressure, bring the tip end of the annular lip 61a into intimate contact with the outer circumferential surface of the second cylindrical portion 24b and prevent the entry of outside air into the first hydraulic chamber 23.

The seal mechanism 40C is provided with the first seal member 43 and the second seal member 52.

The first seal member 43 is arranged in an outer side of the second hydraulic chamber 24 and has a base portion fitted in an annular groove 143 of the outer end surface 241 of the second piston member 24B and a tip end portion 43a normally brought into intimate contact with the inner circumferential surface (opposing surface) 24d of the second cylindrical portion 24b from the side at which the first seal member 43 is mounted.

The second seal member 52 is arranged in the second hydraulic chamber 24 and has a base portion fitted in an annular groove 152 of the inner surface of the end surface portion 24a of the second piston member 24B and a tip end portion 43a protruding toward the second hydraulic chamber 24 from the side at which the second seal member 52 is mounted. The tip end portion of the second seal member 52 is formed in a convex curved shape and, only in a state that the movable sheave 22 is in the lowest speed ratio position, brought into contact with the opposing surface 24e of the second piston member 24B in a compressed state so as to establish a seal between the second cylinder part 24A and the second piston member 24B.

As shown in FIG. 3, the seal mechanism 40E is provided with the first seal member 44 and the third seal member 62.

The first seal member 44 is arranged in an inner side of the hydraulic chamber 33 and has a base portion fitted in an annular groove 144 of the outer end surface 331 of the piston member 33B and a tip end portion 44a normally brought into intimate contact with the inner circumferential surface (opposing surface) 33d of the cylindrical portion 33b from the side at which the first seal member 44 is mounted.

The third seal member 62 is arranged in the hydraulic chamber 33 and has a base portion adhered and fixed to an outward corner of the outer end surface 331 of the piston member 33B and a tip end portion formed as an annular lip 62a. The annular lip 62a has a tip end directed and protruding toward the outside with respect to the hydraulic chamber 33 and a hydraulic chamber 33 side surface brought into elastic contact with the inner circumferential opposing surface 33d of the cylindrical portion 33b of the cylinder part 33A. As mentioned above, the tip end of the annular tip 62a is directed toward the outside with respect to the hydraulic chamber 33. The third seal member 62 is thus allowed to, when the hydraulic pressure inside the hydraulic chamber 33 becomes lower than the outside pressure by the release of hydraulic oil from the hydraulic chamber 33, enhance the contact between the tip end of the annular lip 62a and the inner circumferential surface (opposing surface) of the cylindrical portion 33b of the cylinder part 33A and prevent the entry of outside air into the hydraulic chamber 33.

[Seal Mechanism for Oil Passage]

An oil passage is provided for the supply of hydraulic oil from an external hydraulic oil source to the respective hydraulic chambers 23, 24 and 33. More specifically, oil passages 7a, 2a and 2b are defined to supply the hydraulic oil to the first and second hydraulic chambers 23 and 24 of the primary pulley 20 as shown in FIGS. 1 and 4. The oil passage 2a is formed in a center portion of the transmission input shaft 2. The oil passage 2b is formed in a portion of the transmission input shaft 2 from the center portion of the transmission input shaft 2 to the first and second hydraulic chambers 23 and 24. The oil passage 7a is formed in a hollow oil supply pipe (tubular member) 7 which is fitted in a shaft center hole 2c and arranged coaxially with the primary pulley 20. Herein, the shaft center hole 2c constitutes the oil passage 2a.

The oil supply pipe 7 is unrotatable, whereas the transmission input shaft 2 is rotatable. There is hence a sliding contact part between an outer circumference of the oil supply pipe 7 and an inner circumference of the shaft center hole 2c. A seal mechanism 40F or 40G is arranged to seal this sliding contact part.

The seal mechanism 40F is provided with a first seal member (annular seal member) 45 and a third seal member (lip seal member) 63.

The first seal member 45 has a base portion fitted in an annular groove 145 of the outer circumferential surface of the oil supply pipe 7 and a tip end portion 45 normally brought into intimate contact with the inner circumferential surface (opposing surface) 2d of the shaft center hole 2c.

The third seal member 63 has a base portion 63b attached and fixed to an inner circumferential step portion 6a of an end flange 6, which is disposed around an end portion of the transmission input shaft 2, and a tip end portion formed as an annular lip 63a. The annular lip 63a has a tip end directed and protruding toward the outside with respect to the oil passage 2a from the side at which the third seal member is mounted and an oil passage 2a side surface brought into elastic contact with the outer circumferential opposing surface 7b of the oil supply pipe 7. As mentioned above, the tip end of the annular tip 63a is directed toward the outside with respect to the oil passage 2a. The third seal member 63 is thus allowed to, when the hydraulic pressure inside the oil passage 2a becomes lower than the outside pressure by the release of hydraulic oil from the oil passage 2a, enhance the contact between the tip end of the annular lip 63a and the outer circumferential surface of the oil supply pipe 7 and prevent the entry of outside air into the oil passage 2a.

In the present embodiment, the whole of the inner circumferential side of the third seal member 63 is formed as the annular lip 63a. A metal ring 63c is fitted on an outer circumference of the annular lip 63a so as to retain the tip end of the annular lip 63a and prevent the tip end of the annular lip 63a from becoming apart from the outer circumferential surface of the oil supply pipe 7. Herein, the metal ring 63c is adapted to press the tip end of the annular lip 63a against the outer circumferential surface of the oil supply pipe 7 by a weak force that does not leave a clearance (but, in practice, allows an oil film to lie) between the tip end of the annular lip 63a and the outer circumferential surface of the oil supply pipe 7.

The seal mechanism 40G is provided with a first seal member (annular seal member) 45 and a third seal member (lip seal member) 64.

The first seal member 45 is similar to that of the seal mechanism 45 and has a base portion fitted in an annular groove 145 of the outer circumferential surface of the oil supply pipe 7 and a tip end portion 45a normally brought into intimate contact with the inner circumferential surface (opposing surface) 2d of the shaft center hole 2c.

The third seal member 64 has a base portion 64b adhered and fixed to the inner circumferential step portion 6a of the end flange 6, which is disposed around the end portion of the transmission input shaft 2, and a tip end portion formed as an annular lip 64a. The annular lip 64a has a tip end directed toward the outside with respect to the oil passage 2a and an oil passage 2a side surface brought into elastic contact with the outer circumferential opposing surface 7b of the oil supply pipe 7. As mentioned above, the tip end of the annular tip 64a is directed toward the outside with respect to the oil passage 2a. The third seal member 64 is thus allowed to, when the hydraulic pressure inside the oil passage 2a becomes lower than the outside pressure by the release of hydraulic oil from the oil passage 2a, enhance the contact between the tip end of the annular lip 64a and the outer circumferential surface of the oil supply pipe 7 and prevent the entry of outside air into the oil passage 2a.

The third seal member 64 also has an annular seal portion 64d formed on its inner circumferential side and brought at a tip end thereof into elastic contact with the outer circumferential surface of the oil supply pipe 7. In the present embodiment, the annular lip 64a is formed separately so as to protrude more outwardly than the annular seal portion 64d. A metal ring 64c is fitted in an inner circumference of the annular lip 64a so as to retain the tip end of the annular lip 64a and prevent the tip end of the annular lip 64a from becoming apart from the outer circumferential surface of the oil supply pipe 7. Herein, the metal ring 64c is adapted to press the tip end of the annular lip 64a against the outer circumferential surface of the oil supply pipe 7 by a weak force that does not leave a clearance (but, in practice, allows an oil film to lie) between the tip end of the annular lip 64a and the outer circumferential surface of the oil supply pipe 7.

[Features and Effects]

The above-configured seal mechanism-equipped vehicle continuously variable transmission according to one embodiment of the present invention achieves the following features and effects.

In the case where idle-stop control is executed during stop of the vehicle, the engine-driven oil pump is stopped upon stop of the engine so that the hydraulic oil gradually leaks from the stopped oil pump to the oil tank. The hydraulic pressure inside the first and second hydraulic chambers 23 and 24 of the primary pulley 20 and the hydraulic chamber 33 of the secondary pulley 30 becomes gradually decreased as the hydraulic oil leaks from the oil pump. This leads to the possibility of the entry of air into the hydraulic chamber 23, 24, 33.

The entry of air occurs through the sliding contact part between the fixed and movable members by the hydraulic chamber 23, 24, 33 is defined. In the first hydraulic chamber 23, the sliding contact parts are formed between the outer end surface 231 of the first piston member 23B and the inner circumferential surface of the first cylindrical portion 23b and between the inner end surface 232 of the first piston member 23B and the outer circumferential surface of the hollow shaft 2A. In the second hydraulic chamber 24, the sliding contact part is formed between the outer end surface 241 of the second piston member 24B and the inner circumferential surface of the second cylindrical portion 24b. In the hydraulic chamber 33, the sliding contact part is formed between the outer end surface 331 of the piston member 33B and the inner circumferential surface of the cylindrical portion 33b.

The seal mechanisms 40A to 40C and 40E are arranged in these sliding contact parts. Each of the seal mechanism 40A to 40C and 40E is provided with the first seal member 41, 42, 43, 44 to establish a seal between the cylinder member and the piston member. This first seal member 41, 42, 43, 44 is designed to allow a certain degree of hydraulic oil leakage from the hydraulic chamber 23, 24, 33 to the outside, rather than to completely prevent hydraulic oil leakage from the hydraulic chamber 23, 24, 33 to the outside. The leaking hydraulic oil may be used to lubricate sliding parts in the vicinity of the hydraulic chamber 23, 24, 33. During operation of the oil pump, the hydraulic pressure inside the hydraulic system is sufficiently higher than the outside pressure so that there may occur the leakage of hydraulic oil from the hydraulic chamber 23, 24, 33 to the outside but no entry of air from the outside into the hydraulic chamber 23, 24, 33.

When the pressure inside the hydraulic system becomes decreased upon stop of the oil pump, the entry of outside air into the hydraulic chamber 23, 24, 33 cannot be prevented only by the first seal member 41, 42, 43, 44. However, each of the seal mechanism 40A to 40C and 40E is provided with the second seal member 51, 52 or the third seal member 61, 62 in addition to the first seal member 41, 42, 43, 44 so as to perform a double-seal function in a state that the movable sheave 22, 32 is in the lowest speed ratio position. Accordingly, the seal mechanism attains improved sealing ability to prevent the entry of outside air into the hydraulic chamber.

In particular, the second seal member 51, 52 is allowed to make intimate contact in a compressed state with the opposing surface only in a state that the movable sheave 22, 32 is in the lowest speed ratio position. The seal mechanism thus exerts a greater sealing effect so as to, even when the hydraulic pressure inside the hydraulic system becomes largely decreased, prevent the entry of outside air into the hydraulic chamber 23, 24, 33.

Further, the third seal member 61, 62 is allowed to bring the tip end of the annular lip 61*a* into more intimate contact with the opposing surface as the hydraulic pressure inside the hydraulic system becomes decreased. The seal mechanism thus exerts a greater sealing effect so as to prevent the entry of outside air into the hydraulic chamber 23, 33 even when the pressure inside the hydraulic system becomes largely decreased.

As described above, it is possible for the seal mechanism 40A to 40C and 40E to prevent the entry of outside air into the hydraulic chamber 23, 24, 33 for a long time even when the oil pump is stopped. The entry of air from the hydraulic chamber 23, 24, 33 into the hydraulic system makes it necessary to take time to fill the hydraulic chamber 23, 24, 33 with hydraulic oil, which results in deterioration of startability. This startability deterioration problem is avoided by the utilization of the above-configured seal mechanism.

In the present embodiment, the oil supply pipe 7 is inserted in the shaft center hole 2*c* of the transmission input shaft 2 such that the oil passages 7*a* and 2*a* extend in the oil supply pipe 7 and the shaft center hole 2*c*, respectively, and communicate with each other for the supply of hydraulic oil to the hydraulic chambers 23 and 24.

The seal mechanism 40F or 40G is also arranged in the sliding contact part between the oil supply pipe 7 and the shaft center hole 2*c*. It is therefore possible to prevent the entry of air into the hydraulic chamber 23, 24 from the oil passage 2*a*.

Namely, the seal mechanism 40F is provided with the first seal member (annular seal member) 45 and the third seal member (lip seal member) 63; and the seal mechanism 40G is provided with the first seal member (annular seal member) 45 and the third seal member (lip seal member) 64.

The third seal member 63, 64 is formed with the annular lip 63*a*, 64*b*. The tip end of the annular lip 63*a*, 64*a* is directed toward the outside with respect to the oil passage 2*a*. As a result, the tip end of the annular tip 63*a*, 64*a* is brought into more intimate contact with the outer circumferential surface of the oil supply pipe 7 to prevent the entry of air into the oil passage 2*a* even when the hydraulic pressure inside the oil passage 2*a* becomes lower than the outside pressure with decrease in the hydraulic pressure inside the hydraulic chamber 23.

Even when the engine-driven oil pump is stopped to cause decrease in the hydraulic pressure inside the oil passage 2*a* upon stop of the engine, the contact between the tip end of the annular lip 63*a*, 64*a* and the opposing surface is enhanced with decrease in the hydraulic pressure inside the hydraulic system. The seal mechanism thus exerts a greater sealing effect so as to, even when the hydraulic pressure inside the hydraulic system becomes largely decreased, prevent the entry of outside air into the hydraulic chamber 23, 24.

In the present embodiment, the vane pump is used as the oil pump. The vane pump is relatively simple in structure and advantageous in that it shows a large permissible range for dust particles in a fluid, can compensate for wearing of cam ring and vanes and thereby cause less efficiency deterioration. On the other hand, the vane pump faces the problem of causing the early entry of air into the hydraulic chamber, without being able to suppress the return of oil to the oil tank, due to separation of ends of the vanes from an inner wall of the pump room during stop of the pump. This problem is however also avoided by the adoption of the above-configured seal mechanisms 40A to 40C and 40E to 40G.

During running of the vehicle, the speed ratio of the transmission is controlled to the lowest speed ratio only in a limited situation. At any speed ratio other than the lowest speed ratio, the second seal member 51, 52 does not into contact with the opposing surface and does not exert a sealing effect. In such a case, the seal is established only by the first seal member 41, 43. There would however be no problem without the entry of air into the hydraulic chamber because the oil pump is driven by operation of the engine during running of the vehicle. In addition, the sliding resistance of the second seal member 51, 52 is not caused at any speed ratio other than the lowest speed ratio during running of the vehicle. It is thus possible to ensure the speed ratio control response of the transmission without causing deterioration in the moving response of the movable sheave 22, 32.

The hydraulic pressure inside the hydraulic chamber 23, 24, 33 and inside the oil passage 7*a*, 2*a*, 2*b* becomes increased with the supply of the hydraulic pressure to the hydraulic chamber during running of the vehicle. This makes it likely that hydraulic oil will leak from the hydraulic chamber 23, 24, 33 or oil passage 7*a*, 2*a*, 2*b* to the outside. The leakage of hydraulic oil is however prevented by normally bringing the annular seal member 41, 44, 45 into contact with the opposing surface. With increase in hydraulic pressure, the annular lip of the lip seal member is not drawn toward the hydraulic chamber or oil passage side. The sliding contact between the annular lip and the opposing surface is then weakened so as to suppress the sliding resistance of the third seal member (lip seal member) 61 to 64 even though such weakened contact is not effective in prevention of oil leakage. It is thus possible to ensure the speed ratio control response of the transmission without causing deterioration in the moving response of the movable sheave 22, 32.

Further, it is possible to prevent efficiency deterioration as the sliding resistance is also decreased during speed change operation. For improvement of sealing ability, the lip seal member needs to be strongly pressed against the opposing surface. Such strong pressing results in more wearing of the lip seal member with increase of sliding events. During vehicle running, however, the contact pressure of the lip seal member against the opposing surface becomes weakened with increase in inside hydraulic pressure. The sliding mechanism therefore attains high sealing ability during idle stop while suppressing wearing of the lip seal member during vehicle running.

[Others]

Although the present invention is described with reference to the above embodiment, the present invention is not limited to the above embodiment. Various changes and modifications of the above embodiments can be made without departing from the scope of the present invention.

For example, the primary pulley 20 may alternatively have a single-piston structure although the primary pulley 20 has a double-piston structure with two first and second hydraulic chambers 23 and 24 such that the hydraulic pressure can be received by the back surface 22*a* of the movable sheave 22 and the inner surface of the second piston member 24B in the above embodiment.

Although the secondary pulley 30 has a single-piston structure in the above embodiment, the secondary pulley 30 may alternatively have a double-piston structure. In the case where the secondary pulley has a double-piston structure, it is feasible to add structural members corresponding to the second cylinder member 24A and the second piston member 24B and provide the seal mechanism with a second seal member such that second seal member is arranged on the inner circumferential surface of the second cylinder portion of the second cylinder member and, in a state that the movable sheave 32 is in a lowest speed ratio position, brought into intimate contact with the second piston member.

In the above embodiment, the second seal member 51, 52 is provided on the cylinder member 23A, 24A side and brought into intimate contact with the opposing surface of the piston member 23B, 24B in a state that the movable sheave is in the lowest speed ratio position. Alternatively, the second seal member 51, 52 may be provided on the piston member 23B, 24B side and brought into contact with the intimate contact with the opposing surface of the cylinder member 23A, 24A in a state that the movable sheave is in the lowest speed ratio position.

Although the seal members are placed at the appropriate positions by providing the simple-structured second seal member (annular seal member) in the primary pulley 20 side sliding contact part where the opposing surfaces come closest to each other in a state that the movable sheave is in the lowest speed ratio position and by providing the third seal members (lip seal member) in the other sliding contact parts in the above embodiment, it is feasible to provide the third seal members (lip seal member) in the respective sliding contact parts.

In the above embodiment, the third seal member (lip seal member) is arranged in addition to the first seal member (annular seal member) in the sliding contact part communicating with the oil passage to the primary pulley 20. The third seal member (lip seal member) may be also arranged in the sliding contact part communicating with the oil passage to the secondary pulley 30.

Although the vane pump is used as the mechanical pump in the above embodiment, any other type of mechanical pump such as gear pump can alternatively be used.

The seal mechanism according to the present invention is applicable even in the case where the hydraulic pressure source has an electric pump in combination with or in place of the mechanical pump. In this case, it is possible to reduce the load of the electric pump during stop of the vehicle.

The seal mechanism according to the present invention may be applied to some of hydraulic chambers in the CVT.

The invention claimed is:

1. A continuously variable transmission of a vehicle, comprising:
    primary and secondary pulleys each having a fixed sheave and a movable sheave driven by hydraulic pressure from a hydraulic pressure source; and
    a belt wound around the primary and secondary pulleys;
    a fixed member arranged on a back surface side of the movable sheave and fixed to a shaft around which the fixed sheave is disposed;
    a movable member fixed to the back surface side of the movable sheave;
    a hydraulic chamber defined by the movable member and the fixed member; and
    a oil passage communicating with the hydraulic chamber,
    a sliding contact part being formed to partition either the hydraulic chamber or the oil passage from the outside,
    wherein the continuously variable transmission further comprises a seal mechanism that seals the sliding contact part by being brought into intimate contact with an opposing surface of the sliding contact part from a side at which the seal mechanism is mounted, and
    wherein the seal mechanism comprises:
    an annular seal member normally brought into intimate contact with the opposing surface;
    a lip seal member provided with an annular lip such that a tip end of the annular lip is directed toward the outside from a side at which the either the hydraulic chamber or the oil passage is located and such that a side surface of the annular lip located closer to the either the hydraulic chamber or the oil passage is brought in elastic contact with the opposing surface; and
    a seal member brought into intimate contact with the opposing surface only in a state that the movable sheave is in a lowest speed ratio position.

2. The continuously variable transmission of the vehicle according to claim 1, wherein hydraulic pressure source has a mechanical pump driven by an engine of the vehicle.

3. The continuously variable transmission of the vehicle according to claim 1, wherein the sliding contact part is formed between the fixed member and the movable member.

4. The continuously variable transmission of the vehicle according to claim 1,
    wherein the shaft around which the fixed sheave is disposed has a shaft center hole formed therein along a center line of the shaft and communicating with the hydraulic chamber through a communication passage;
    wherein the continuously variable transmission further comprises a tubular member inserted at one end portion thereof in the shaft center hole and having a hollow hole communicating with the hydraulic pressure source;
    wherein the oil passage is defined by the hollow hole, the shaft center hole and the communication passage; and
    wherein the sliding contact part is formed between an inner circumference of the shaft center hole and an outer circumference of the tubular member.

5. The continuously variable transmission of the vehicle according to claim 2, wherein the hydraulic pressure source has a vane pump.

* * * * *